United States Patent [19]

Evron

[11] Patent Number: 4,491,335

[45] Date of Patent: Jan. 1, 1985

[54] INFANTS' CARRIAGES

[76] Inventor: Amos Evron, No. 1 Inbar St., Neve Monosson, Israel

[21] Appl. No.: 363,619

[22] Filed: Mar. 30, 1982

[30] Foreign Application Priority Data

Apr. 10, 1981 [IL] Israel ............................................ 62632

[51] Int. Cl.[3] .............................................. B62B 11/00
[52] U.S. Cl. ....................................... 280/47.41; 16/44; 16/47; 267/179; 280/644; 280/649; 280/658
[58] Field of Search ..................... 280/644, 47.41, 649, 280/658, 647; 16/39, 44, 47; 403/292, 297, 298, 378; 267/179

[56] References Cited

U.S. PATENT DOCUMENTS

| 348,052 | 8/1886 | Pleukharp | 16/47 X |
|---|---|---|---|
| 632,166 | 8/1899 | Berninghaus et al. | 16/47 |
| 1,194,780 | 8/1916 | Pavey et al. | 280/46 |
| 1,622,447 | 3/1927 | Kalberer | 16/47 |
| 1,915,649 | 6/1933 | Devillers | 280/112 R |
| 2,062,320 | 12/1936 | Langer | 16/44 |
| 2,347,524 | 4/1944 | Swan | 16/44 |
| 2,413,761 | 1/1947 | Groover | 280/109 |
| 2,529,162 | 11/1950 | Kier | 280/701 |
| 2,712,945 | 7/1955 | Peterson | 16/44 |
| 2,852,883 | 7/1958 | Walsh | 16/44 |
| 3,123,378 | 3/1964 | Caldwell | 280/104 |
| 3,337,230 | 8/1967 | Golding | 280/644 |
| 3,653,681 | 4/1972 | Virtue | 280/36 B |
| 3,692,323 | 9/1972 | Sekine | 280/47.38 |
| 3,699,609 | 10/1972 | Spatz | 16/44 |
| 3,794,132 | 2/1974 | Moon | 180/13 |
| 4,078,817 | 3/1978 | Ferguson et al. | 280/242 WC |
| 4,120,071 | 10/1978 | Crescenzi | 16/37 |
| 4,219,904 | 9/1980 | Melara | 16/31 R |

FOREIGN PATENT DOCUMENTS 155338  12/1920  United Kingdom .................... 16/44

Primary Examiner—Joseph F. Peters, Jr.
Assistant Examiner—Michael Mar
Attorney, Agent, or Firm—Lerner, David, Littenberg, Krumholz & Mentlik

[57] ABSTRACT

An infants' carriage of the "stroller" type comprises a chassis consisting of two pairs of crossing bars which carry wheels at their lower ends. These wheels are connected to the bars via a cushioning member which consists of a sleeve closed at one end and containing a helical spring against which abuts the end of one of the crossing bars extending into the sleeve.

11 Claims, 5 Drawing Figures

INFANTS' CARRIAGES

BACKGROUND OF INVENTION

This invention relates to infants' carriages and more particularly to those commonly called "go-carts" or strollers. These carriages comprise a chassis or skeleton structure consisting usually of two pairs of crossing bars, wheels being provided at the lowermost ends of the four bars. The carriages of this build are lightweight and therefore are apt to be inconveniently affected by even small irregularities of the terrain on which they travel. A small stone—or any other slight outcrop of the ground—causes the pushed carriage to jump and in some cases to tilt dangerously to the infant riding in the carriage. It has even happened that a carriage has overturned.

OBJECTS OF INVENTION

It is the object of the present invention to provide means which cushion the effect of irregularities of the ground over which the carriage rides.

It is another object of the invention to provide means permitting the wheels of the travelling carriage to tilt to a certain extent whenever meeting whatever obstruction, without affecting the normal position of the carriage itself.

SHORT SUMMARY OF DISCLOSURE

According to the invention, therefore, there is provided an infants' carriage of the type referred to characterised thereby that each of the wheels at the end of one of said bars is connected to the latter by a cushioning member consisting of a sleeve closed at one end, a member comprising a helical spring belt positioned at the said closed end within the sleeve and abutting on the inner side of the bottom, the end of each of the said bars forming the said chassis extending into the open end of the sleeve, resting on the said helical spring.

SHORT DESCRIPTION OF DRAWINGS

The invention will now be described in detail with reference to the annexed drawings in which:

FIG. 1 is a perspective view of an infants' carriage of the type referred to.

DETAILED DESCRIPTION OF PREFERRED EMBODIMENT

Figure 1:
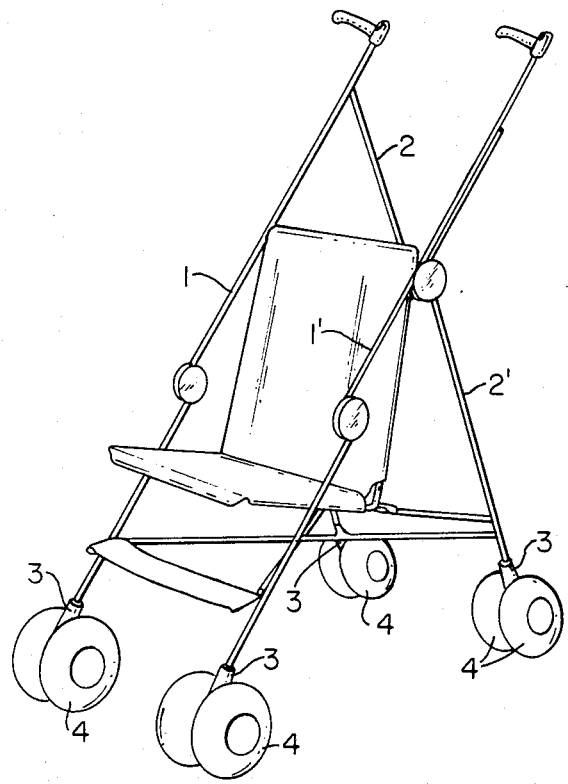

As can be seen in FIG. 1, the carriage comprises—in a conventional manner—a chassis or skeleton consisting of two pairs of crossing bars 1-1' and 2-2'. The new cushioning means—which will be described more specifically—are indicated in FIG. 1 by numeral 3. The wheels (in the example of FIG. 1 a pair of wheels on each bar) are indicated by the numeral 4 on each bar and are connected to the bars 1-1'-2-2' via the said members 3.

Figure 2:
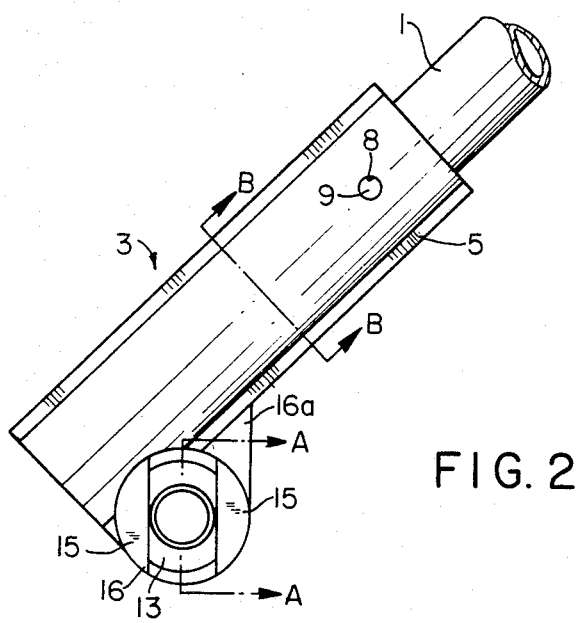
FIG. 2 shows, on a larger scale, the end of one of the bars forming the chassis of the carriage.
Figure 3:
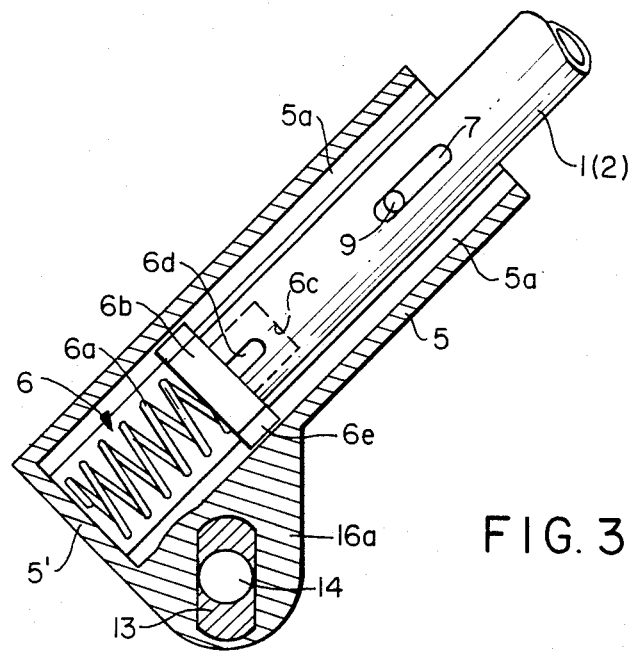
FIG. 3 is an axial section through the end of the bar shown in FIG. 2.

Turning now to FIGS. 2 and 3, the members 3 comprise a sleeve 5 (FIG. 3) the lower end of which—at 5'—is closed. Laterally extending from sleeve 5 is a cylindrical part 16 to which reference will be had later.

Into each sleeve 5 extends from above one of the bars 1, 1', 2, 2' which are hollow. In the lowermost end of each sleeve 5 is positioned a cushioning member indicated as a whole by numeral 6 and consisting of a strong helical spring 6a and a plate 6b connected with the spring 6a. From the upper face of plate 6b extends a stud 6c. This latter enters the end of the respective bar 1, 1', 2, 2'. The tubular bars have, some short distance from their ends (which is within sleeve 5) an elongated slot 7. In the cylindrical wall of sleeve 5 two diametrically oppositely positioned holes 8 are provided (see FIG. 2) through which a pin 9 is passed, across sleeve 5 and across the end of the respective bar 1, 2.

From the plate 6b and on the side at which stud 6c is positioned extend two oppositely disposed short ribs 6d (see also FIG. 3) which are engaged in registering cutouts in the end of any one of the tubular bars 1, 1', 2, 2'. Thus the said bars cannot turn relative to member 6. In the inner wall of sleeve 5 are provided two oppositely disposed grooves 5a in which can slide (in the longitudinal direction of the sleeve) two radial protrusions 6e of plate 6b, thus preventing turning of member 6 in the sleeve 5.

In the cylindrical members 16 connected with sleeves 5 by a web 16a is provided an interior space 10. The wall of cylinder 16 bulges inwardly at its middle portion 11 and in this thickened portion of the wall two oppositely disposed concavities 12 are provided. These concavities 12 serve as a seat for a member 13 which in its seat can perform a rocking movement as indicated by the arrow X in FIG. 4. Member 13 has a throughgoing bore 14 through which the axle of wheels 4 passes. In assembling the parts member 13 (which is made of plastics, as is member 16) is forcibly pushed into member 16 and snaps into position in seat 12. The member 13 can perform only the movement symbolized by the arrow X, being prevented from performing differently directed movements by segment shaped plates 15 at both ends of cylinder 16.

The new arrangements function as follows:

Supposing the carriage is pushed over uneven ground, say a cobblestone paved street, the outcropping parts will alternatingly strike the wheels but the impact will—to a great part—become absorbed and will be cushioned by the spring 6a, the effect being a compression of the spring causing the respective bar 1, 1', 2, 2' to move towards the closed end of sleeve 5. This movement is limited by slot 7, the pin 9 normally at the lower end of the slot, moving towards the upper end thereof, maximally to the very end. Obviously, after each impact on the wheel, the spring reassumes its normal, extended state.

Figure 4:
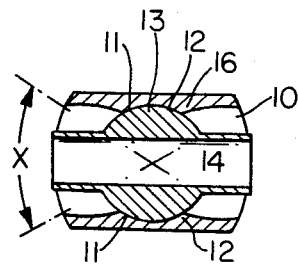
FIG. 4 is a section on line A—A of FIG. 2.
Figure 5:
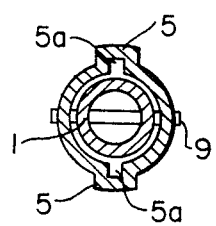
FIG. 5 is a section on line B—B of FIG. 2.

As has been stated, the axle of the wheels extends through member 13. The axle may either turn in the bore 14, the wheel—or wheels being keyed to the ends of the axle or the axle may be fixed in the member 13 and the wheels turn on its ends. Whenever due to unevenness of the ground a wheel tends to tilt, the member 13 moves (as indicated in FIG. 4) in one or the other direction, compensating for the tendency to tilt.

It can easily be seen that the above described improvement results in a smooth and impact free travel of the carriage.

I claim:

1. An infant carrier comprising a chassis including two pairs of crossing tubular frame members, each of said tubular frame members including a first end and a second end and a rotatable wheel member at said first end thereof, each of said rotatable wheel members being connected to said first end of one of said tubular frame members by connecting means, said connecting means comprising a sleeve member including a tubular cavity having an open end and a closed end for slidably receiving said tubular frame member, and at least one longitudinally extending slot member, spring means disposed within said tubular cavity at said closed end thereof for cushioning said first end of said tubular frame member after it has been inserted into said tubular cavity, said spring means including a first end and a second end, said first end of said spring means being located at said closed end of said tubular cavity and said second end of said spring means including plate means fixedly attached thereto, said plate means including a first face and a second face, said first face of said plate means being fixedly attached to said spring means and said second face of said plate means being in abutment with said first end of said tubular frame member and including rib means projecting therefrom, said plate means further including at least one corresponding radial protrusion extending therefrom for slidable engagement with said slot member, whereby rotational motion between said plate means and said sleeve member is substantially prevented, and said first end of said tubular frame member including rib-enclosing means whereby said rib means project into said rib-enclosing means to prevent rotational movement between said plate means and said first end of said tubular frame member.

2. The infant carrier of claim 1 wherein said rib means comprises a pair of rib members projecting from opposite sides of said second face of said plate means and said rib-enclosing means comprises cutout portions radially disposed on either side of said tubular frame member for accepting said rib members.

3. The infant carrier of claim 2 wherein said plate means includes a stud member projecting from said second face thereof, said stud member being centrally located on said plate member so as to be received within the interior of said tubular frame member.

4. The infant carrier of claim 3 wherein said rib member and said stud member comprises a single integral element.

5. The infant carrier of claim 1 wherein said sleeve member includes two oppositely disposed longitudinally extending slot members, and said plate means includes two oppositely disposed corresponding radial protrusions extending therefrom for slidable engagement with each of said longitudinally extending slot members.

6. The infant carrier of claim 1 wherein said tubular frame member includes a longitudinally extending slot having a predetermined length, and wherein said sleeve member includes aperture means for alignment with said slot member of said tubular frame member, and including pin means extending through said aperture means in said sleeve member into said slot means of said tubular frame member so as to limit the longitudinal movement of said tubular frame member within said sleeve member.

7. An infant carrier comprising a chassis including two pairs of crossing tubular frame members, each of said tubular frame members including a first end and a second end and a rotatable wheel member at said first end thereof, each of said rotatable wheel members being connected to said first end of one of said tubular frame members by connecting means, said connecting means comprising a sleeve member including a tubular cavity having an open end and a closed end for slidably receiving said tubular frame member, helical spring means including a first end and a second end disposed within said tubular cavity at said closed end thereof for cushioning said first end of said tubular frame member after it has been inserted into said tubular cavity, said first end of said helical spring means being located at said closed end of said tubular cavity and said second end of said helical spring means including plate means fixedly attached thereto, said plate means including a first face and a second face, said first face of said plate means being fixedly attached to said helical spring means and said second face of said plate means being in abutment with said first end of said tubular frame member, rib means projecting from said second face of said plate means, and said first end of said tubular frame member including rib-enclosing means, whereby said rib means projects into said rib-enclosing means to prevent rotational movement between said plate means and said first end of said tubular frame member, said sleeve member including a transversly extending body member including socket means therein, and seat means for application to said socket means, said seat means including passage means for accepting an axle for said rotatable wheel member, said seat means being pivotable within said socket member whereby when said axle for said wheel member is inserted into said passage means said wheel member is pivotable in a direction substantially perpendicular to the surface on which said wheel member is intended to be applied.

8. The infant carrier of claim 7 wherein said transversly extending body member includes a hollow interior portion, and wherein said socket means comprises a pair of oppositely disposed concave wall portions within said hollow interior portion of said transversly extending body member.

9. The infant carrier of claim 8 wherein said seat means includes generally spherical portions for disposition in said concave wall portions of said body member, and wherein said passage means passes through said generally spherical portions.

10. The infant carrier of claim 9 wherein said transversly extending body member includes projecting wall portions for preventing pivotable movement of said wheel member in a direction other than the direction substantially perpendicular to the surface on which said wheel member is intended to be applied.

11. The infant carrier of claim 7 wherein said sleeve means includes at least one longitudinally extending slot member, and said plate means includes at least one corresponding radial protrusion extending therefrom for slidable engagement with said slot member whereby rotational motion between said plate means and said sleeve member is substantially prevented.

* * * * *